United States Patent
Isaji et al.

(10) Patent No.: US 8,158,030 B2
(45) Date of Patent: *Apr. 17, 2012

(54) PROCESS FOR PRODUCING DISPERSION LIQUID OF INTRINSIC ELECTROCONDUCTIVE POLYMER IN ORGANIC SOLVENT

(75) Inventors: Tadayuki Isaji, Funabashi (JP); Satoshi Fujita, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 12/376,941

(22) PCT Filed: Dec. 8, 2006

(86) PCT No.: PCT/JP2006/324508
§ 371 (c)(1),
(2), (4) Date: Mar. 12, 2009

(87) PCT Pub. No.: WO2007/052852
PCT Pub. Date: May 10, 2007

(65) Prior Publication Data
US 2010/0038596 A1    Feb. 18, 2010

(30) Foreign Application Priority Data
Aug. 10, 2006  (JP) ................. 2006-217998

(51) Int. Cl.
    H01B 1/12    (2006.01)
    H01B 1/20    (2006.01)
(52) U.S. Cl. .......................................... 252/500
(58) Field of Classification Search .................. 252/500
    See application file for complete search history.

(56) References Cited

U.S. PATENT DOCUMENTS

| | | | |
|---|---|---|---|
| 5,300,575 A | 4/1994 | Jonas et al. | |
| 5,567,355 A | 10/1996 | Wessling et al. | |
| 6,203,727 B1 * | 3/2001 | Babinec et al. | 252/500 |
| 6,429,282 B1 * | 8/2002 | Wang et al. | 528/422 |
| 6,612,666 B1 | 9/2003 | Berning | |
| 7,008,562 B2 | 3/2006 | Jonas et al. | |
| 7,683,124 B2 * | 3/2010 | Wessling | 524/800 |
| 2002/0173579 A1 | 11/2002 | Jonas et al. | |
| 2003/0006401 A1 | 1/2003 | Haghighat et al. | |
| 2005/0224765 A1 | 10/2005 | Hsu et al. | |
| 2006/0071201 A1 * | 4/2006 | Jonas et al. | 252/500 |

FOREIGN PATENT DOCUMENTS

| | | |
|---|---|---|
| EP | 0 329 768 B1 | 8/1989 |
| EP | 0 440 957 A2 | 8/1991 |
| EP | 1 373 356 B1 | 1/2004 |
| EP | 1 553 142 A2 | 7/2005 |
| EP | 2 031 012 A1 | 3/2009 |
| JP | 2-500918 A | 3/1990 |
| JP | 7-90060 A | 4/1995 |
| JP | 2004-532292 A | 10/2004 |
| JP | 2004-532298 A | 10/2004 |
| JP | 2006-5144 A | 1/2006 |
| WO | WO 2005070972 A1 * | 8/2005 |
| WO | WO-2006/087969 A1 | 8/2006 |

* cited by examiner

Primary Examiner — Douglas McGinty
(74) Attorney, Agent, or Firm — Birch, Stewart, Kolasch & Birch, LLP

(57) ABSTRACT

This invention provides a process for producing a dispersion liquid of an intrinsic electroconductive polymer in an organic solvent, comprising a deionization step of deionizing an aqueous colloid dispersion liquid of an intrinsic electroconductive polymer by a liquid feeding method to remove cations adsorbed on the intrinsic electroconductive polymer, a solvent displacement step of subjecting water in the aqueous colloid dispersion liquid after the deionization step to solvent displacement with an organic solvent (excluding N-methylpyrrolidone and dimethyl sulfoxide), and an additive treatment step of, after the solvent displacement step, adding N-methylpyrrolidone or dimethyl sulfoxide. This process can easily produce a dispersion liquid of an intrinsic electroconductive polymer in an organic solvent that can be used in various applications such as electrode materials, antistatic agents, ultraviolet absorbers, heat absorbers, electromagnetic wave absorbers, sensors, electrolytes for electrolytic capacitors, and electrodes for rechargeable batteries.

12 Claims, No Drawings

PROCESS FOR PRODUCING DISPERSION LIQUID OF INTRINSIC ELECTROCONDUCTIVE POLYMER IN ORGANIC SOLVENT

TECHNICAL FIELD

The present invention relates to a method for production of organic solvent dispersion of intrinsically conductive polymer.

BACKGROUND ART

Aromatic conductive polymers, such as polyaniline, polythiophene, and polypyrrole, seem useful because of their good stability and high conductivity but they are limited in the field of application because of their poor processability due to insolubility in organic solvents.

According to a recent report, it is possible to improve processability by dispersing the conductive polymer into water or an organic solvent such as aromatic solvent. (See Patent Document Nos. 1 and 2.)

Making the above-mentioned conductive polymer into a dispersion involves its conversion into an intrinsically conductive polymer by addition of a dopant and subsequent dispersion in water or a mixture of water and hydrophilic solvent. However, the complexity of these steps prevents the conductive polymer from being used in the form of coating material.

One way proposed to address this problem is by solvent substitution. (See Patent Document Nos. 3 and 4.) The method disclosed in Patent Document No. 3 is very complex because solvent substitution needs vigorous stirring.

There is a simple method for solvent substitution that involves deionization with an ion-exchange material. This method, however, is incapable of removing cations strongly adhered to the surface of particles of intrinsically conductive polymer, and hence it merely gives an unstable dispersion (with a water content no less than 1 wt %) of intrinsically conductive polymer in an organic solvent. (See Patent Document No. 4.)

The above-mentioned problems encountered in the prior art technology have to be solved to enlarge the application field of the conductive polymer, and hence there is a demand for a simple method for preparing an organic solvent dispersion of an intrinsically conductive polymer.

[Patent Document 1] JP-A-H7-90060
[Patent Document 2] JP-A-H2-500918
[Patent Document 3] JP-A-2004-532292
[Patent Document 4] JP-A-2004-532298

DISCLOSURE OF THE INVENTION

Problems to be Solved by the Invention

The present invention was completed in view of the foregoing. It is an object of the present invention to provide a simple method for producing an organic solvent dispersion of an intrinsically conductive polymer which can be applied to various uses as electrode materials, antistatic agents, UV light absorbers, heat ray absorbers, electromagnetic wave absorbers, sensors, electrolyte for electrolytic capacitors, and electrodes for secondary batteries.

Means for Solving the Problems

In order to solve the above-mentioned problems, the present inventor carried out a series of investigations, which led to the finding that dispersion of an intrinsically conductive polymer into an organic solvent is possible if its aqueous colloidal dispersion undergoes deionization by a passing of liquid and subsequent solvent substitution (International Patent Application No. PCT/JP2006/302326).

Based on the above method, the inventor made further studies on an improvement thereof and, as a result, found that when a specific additive is added after the solvent substitution, a thin film obtained from the resulting organic solvent dispersion of an intrinsically conductive polymer is increased in conductivity, thereby accomplishing the invention.

The present invention is directed to the following aspects (1) to (22).

(1) A method for producing an organic solvent dispersion of an intrinsically conductive polymer, which includes:

a deionizing step of deionizing an aqueous colloidal dispersion of an intrinsically conductive polymer by the passing of liquid, thereby clearing the intrinsically conductive polymer of cations adhering thereto;

a solvent substitution step of substituting water in the aqueous colloidal dispersion with an organic solvent except for N-methylpyrrolidone and dimethylsulfoxide after the deionizing step; and an additive-treating step of adding N-methylpyrrolidone or dimethylsulfoxide to the dispersion obtained by the solvent substitution step.

(2) The method of 1 above, wherein an amount of the N-methylpyrrolidone or dimethylsulfoxide ranges from 0.01 to 5.00% (W/V) relative to the total volume of the organic solvent dispersion.

(3) The method of 2 above, wherein the amount of the N-methylpyrrolidone or dimethylsulfoxide ranges from 0.01 to 0.99% (W/V) relative to the total volume of the organic solvent dispersion.

(4) The method of 1 above, wherein the deionizing step is accomplished by ion exchange.

(5) The method of 1, further including a filtration step of subjecting the aqueous colloidal dispersion of an intrinsically conductive polymer to ultrafiltration before the deionizing step.

(6) The method of 1 above, wherein the solvent substitution step is accomplished in such a way as to keep a solid contents in a range of 0.05 to 10.0 wt %.

(7) The method of 1 above, wherein the solvent substitution step is accomplished in such a way as to reduce a water content below 1%.

(8) The method of 1 above, wherein the solvent substitution step is accomplished by slowly adding the organic solvent to the aqueous colloidal dispersion, thereby removing water.

(9) The method of 1 above, wherein the organic solvent is an alcohol having 1 to 3 carbon atoms.

(10) The method of 1 above, wherein the organic solvent has a boiling point of not higher than 80° C.

(11) The method of 1, wherein the intrinsically conductive polymer contains at least an aniline unit.

(12) The method of 1, wherein the intrinsically conductive polymer is doped polyaniline, doped polythiophene, a mixture thereof or a copolymer thereof.

(13) An organic solvent dispersion of an intrinsically conductive polymer obtained by the method defined in any one of 1 to 12 above.

(14) A dispersion of an intrinsically conductive polymer in an organic solvent except for N-methylpyrrolidone and dimethylsulfoxide, which including N-methylpyrrolidone or dimethylsulfoxide, a water content being less than 1%.

(15) The dispersion of 14 above, wherein a content of the N-methylpyrrolidone or dimethylsulfoxide ranges from 0.01 to 5.00% (W/V) relative to the total volume of the organic solvent dispersion.
(16) The dispersion of 15 above, wherein the content of the N-methylpyrrolidone or dimethylsulfoxide ranges from 0.01 to 0.99% (W/V) relative to the total volume of the organic solvent dispersion.
(17) The dispersion of 14 above, wherein the organic solvent is an alcohol having 1 to 3 carbon atoms.
(18) The dispersion of 14 above, wherein the organic solvent has a boiling point of not higher than 80° C.
(19) The dispersion of 14 above, wherein the intrinsically conductive polymer has at least an aniline unit.
(20) The dispersion of 14 above, wherein the intrinsically conductive polymer is a doped polyaniline, a doped polythiophene, a mixture thereof or a copolymer thereof.
(21) The dispersion of 14 above, wherein the conductive polymer is a mixture of a doped polyaniline and a doped polythiophene, or a copolymer thereof.
(22) The dispersion of 14 above, wherein the intrinsically conductive polymer is a mixture of a doped polyaniline and a doped polythiophene.

Effect of the Invention

The method according to the present invention permits easy production of an organic solvent dispersion of an intrinsically conductive polymer, with its water content reduced below 1%.

Since certain types of additives are contained in the organic solvent dispersion of an intrinsically conductive polymer of the invention, a thin film or the like prepared from this dispersion exhibits excellent conductivity.

The organic solvent dispersion of an intrinsically conductive polymer which is produced by the method of the present invention has a simple composition and finds use as a coating material which gives a thin film having such properties as electrical conductivity and/or absorption of heat rays (infrared rays) characteristic of intrinsically conductive polymers. Therefore it will find use in broad application fields including electrode material, antistatic agent, UV light absorber, heat ray absorber, electromagnetic wave absorber, sensors, electrolyte for electrolytic capacitors, and electrodes for secondary batteries. Thus the present invention will enlarge the application fields of conductive polymers.

BEST MODE FOR CARRYING OUT THE INVENTION

A detailed description of the invention will be given in the following.

The method for producing an organic solvent dispersion of an intrinsically conductive polymer according to the invention includes a deionizing step of deionizing an aqueous colloidal dispersion of an intrinsically conductive polymer by the passing of liquid, thereby clearing the intrinsically conductive polymer of cations adhering thereto, a solvent substitution step of substituting water in the aqueous colloidal dispersion with an organic solvent after the deionizing step, and an additive-treating step of adding N-methylpyrrolidone or dimethylsulfoxide to the dispersion obtained by the solvent substitution step.

The term "intrinsically conductive polymer" as used in the present invention denotes those polymers which are in the form of polyradical cationic salt or polyradical anionic salt that result from doping and hence which exhibit electrical conductivity by themselves.

Intrinsically conductive polymers suitable for the present invention are not specifically restricted; they include any known polymers in doped form of aniline, pyrrole, thiophene, acetylene, etc., and derivatives thereof. It will be noted that although they may be used alone or in combination with one another, it is preferred to use polymers part of which contains at least an aniline unit. The dopants for the intrinsically conductive polymers are exemplified by sulfonic acids (such as polystyrenesulfonic acid, methanesulfonic acid, alkylbenzenesulfonic acid, and camphor sulfonic acid), carboxylic acids (such as acetic acid), hydrogen halides (such as hydrochloric acid, and hydrobromic acid).

Desirable samples of the intrinsically conductive polymer may be prepared by the method disclosed in JP-A-H7-90060 and JP-A-H2-500918. Polythiophene (typically (3,4-ethylenedioxythiophene), polyaniline, a mixture thereof and a copolymer thereof, which are commercially available in the form of aqueous colloidal dispersion, are also desirable. The polyaniline, a mixture of polyaniline and polythiophen or a copolymer thereof are most suitable because their aqueous colloidal dispersion are composed of very small particles.

The aqueous colloidal dispersion of the intrinsically conductive polymer contains a large amount of free ions originating from excess dopant (such as sulfonic acid) and also free ions (such as ammonium ions, potassium ions, sulfate ions, etc.) originating from decomposition products of salts (such as ammonium persulfate and potassium persulfate) used for production. Also, such cations as ammonium ions and potassium ions are strongly adhered to the dopant portion of the particles of the intrinsically conductive polymer in the dispersion.

Consequently, it is necessary to remove these free ions and excess dopant before the intrinsically conductive polymer is dispersed into an organic solvent so that they will not adversely affect stable dispersion.

[Deionizing Step]

The present invention involves a deionizing step which is intended to remove free ions, excess dopant, and cations adhering to the intrinsically conductive polymer.

A method for deionization is not specifically restricted so long as it can remove cations adhering to the intrinsically conductive polymer. However, ion exchange is a preferred method for deionization because it effectively removes cations strongly adhering to the intrinsically conductive polymer. This object is achieved by bringing an aqueous colloidal dispersion of the intrinsically conductive polymer into contact with a cation exchange resin and/or an anion exchange resin. This step can be carried out at 0° C. to 100° C., preferably at 5° C. to 50° C. in consideration of the heat resistance and workability of the ion exchange resin.

The cation exchange resin is not specifically restricted; it may be selected from commercial ones. A preferred example is hydrogen form strong acid cation exchange resin, which is available under a trade name of Amberlite IR-120B (from Organo). The anion exchange resin is not specifically restricted either; it may be selected from commercial ones. A preferred example is hydroxyl group form strong base anion exchange resin, which is available under a trade name of Amberlite IRA-410 (from Organo).

There are not specific restrictions on the method of bringing an aqueous colloidal dispersion of the intrinsically conductive polymer into contact with an ion exchange resin so long as the method can clear the intrinsically conductive polymer of cations adhering thereto. Removal of cations is accomplished most effectively by the passing of liquid, that is, by passing an aqueous colloidal dispersion of the intrinsically conductive polymer through a column filled with an ion exchange resin. A space velocity of about 1 to 10 per hour is adequate for this process.

Deionization is accomplished more effectively by employing both a cation exchange resin and an anion exchange resin than by employing only either of them. The order of contact with the two ion exchange resins is not specifically restricted; however, it is desirable to make contact with a cation exchange resin and then with an anion exchange resin because the aqueous colloidal dispersion increases in pH after anion exchange, with the result that the intrinsically conductive polymer loses its dopant and decreases in conductivity.

The aqueous colloidal dispersion may contain about 0.001 to 10.0 wt % of solids when it undergoes deionization by means of ion exchange. However, the solid contents should preferably be about 0.05 to 5.0 wt % in view of workability and productivity. In the case where the intrinsically conductive polymer is polyaniline, a mixture of polyaniline and polythiophen or a copolymer thereof, the aqueous colloidal dispersion should preferably have a pH value lower than 3 and an electric conductivity value lower than 5 mS/cm if it contains 1 wt % of solids.

It will be noted that the aqueous colloidal dispersion of an intrinsically conductive polymer, which has been deionized according to an ion exchange method, has the possibility that dopants necessary for keeping conductivity are also removed, so that dopants may be supplemented after the deionizating treatment in some cases.

[Filtration Step]

The aqueous colloidal dispersion can be purified more if deionization (mentioned above) is preceded by ultrafiltration which effectively removes free ions and excess dopant.

Ultrafiltration may be accomplished by using an ultrafiltration membrane or tube. The temperature for this procedure should preferably be about 0 to 80° C., which is low enough for adequate ultrafiltration. Continuous or intermittent water supply during ultrafiltration is desirable to ensure complete removal of free ions and excess dopant.

The ultrafiltration membrane or tube used in this step is not specifically restricted in its molecular weight cutoff. The one with a molecular weight cutoff of 10,000 to 200,000 is desirable. Ultrafiltration with an excessively small molecular weight cutoff takes a very long time; ultrafiltration with an excessively large molecular weight cutoff also permits the intrinsically conductive polymer to escape.

Ultrafiltration should preferably be performed on an aqueous colloidal dispersion of an intrinsically conductive polymer containing about 0.001 to 10.0 wt % of solids. Concentrations of about 0.05 to 5.0 wt % is more desirable for good workability and productivity. Duration of filtration is usually 1 to 50 hours, although not specifically restricted.

In the case where the intrinsically conductive polymer is polyaniline, the aqueous colloidal dispersion should preferably have a pH value lower than 3 if it contains 3 wt % of solids. In the case where the intrinsically conductive polymer is poly-3,4-ethylenedioxythiophene, the aqueous colloidal dispersion should preferably have a pH value lower than 3 if it contains 1.3 wt % of solids.

The aqueous colloidal dispersion of intrinsically conductive polymer decreases in pH value after it has undergone ultrafiltration. It further decreases in pH value after it has undergone deionization. Its pH value should preferably be lower than 2 if the intrinsically conductive polymer is polyaniline and the solid contents is 3 wt %, and lower than 2.5 if the intrinsically conductive polymer is poly-3,4-ethylenedioxythiophene and the content of solids is 1 wt %.

[Solvent Substitution Step]

The aqueous colloidal dispersion of intrinsically conductive polymer, which has undergone deionization as mentioned above, subsequently undergoes solvent substitution, so that it is converted into an organic solvent dispersion of an intrinsically conductive polymer.

Solvent substitution may be accomplished in any manner; for example, by removing water from the aqueous colloidal dispersion under normal pressure or reduced pressure and then adding an organic solvent to it, by adding an organic solvent to the aqueous colloidal dispersion and then removing water from it under normal pressure or reduced pressure, or by removing water while adding by slow degrees an organic solvent to the aqueous colloidal dispersion under normal pressure or reduced pressure. The last method is most desirable to minimize the water content in the organic solvent dispersion of intrinsically conductive polymer.

Organic solvents to be used for solvent substitution are not specifically restricted so far as organic solvents other than N-methylpyrrole and dimethylsulfoxide used as an additive are used. In order to efficiently remove water, hydrophilic organic solvents are preferred. The hydrophilic organic solvents include, for example, alcohols such as methanol, ethanol, 1-propanol, 2-propanol, 1-butanol, 1-hexanol, 1-octanol and the like, ketones such as acetone, methyl ethyl ketone, diethyl ketone and the like, amides such as formamide, N-methylacetamide, and the like, ethers such as diethyl ether and the like, and esters such as methyl acetate, ethyl acetate and the like.

Of these, alcohols having 1 to 3 carbon atoms such as methanol, ethanol, 1-propanol, 2-propanol and the like are preferred.

Especially, when taking the convenience in practical application into account, an organic solvent having a boiling point of 80° C. or lower is favorable.

It will be noted that these organic solvents may be used singly or in combination of two or more.

Solvent substitution should be carried out at an adequate temperature which depends on the boiling point of the solvent to be used. It should proceed under reduced pressure at as low a temperature as possible so that it will not deteriorate the intrinsically conductive polymer. The dispersion which undergoes solvent substitution should preferably contain about 0.05 to 10.0 wt % of solids for good workability and productivity. If water is to be removed while an organic solvent is being added slowly, it is desirable to add the organic solvent at an adequate rate which keeps the solid contents in the above-mentioned range.

[Additive-Treating Step]

The invention further includes a step of adding a compound capable of further improving conductivity to the organic solvent dispersion of an intrinsically conductive polymer obtained by the method mentioned above.

The compound capable of improving conductivity includes N-methylpyrrolidone, dimethylsulfoxide, ethylene glycol, N,N-dimethylacetamide, dimethylformamide, tetrahydrofuran, acetonitrile and the like. In view of the effect of improving conductivity, N-methylpyrrolidone and dimethylsulfoxide are preferred.

The amount of the compound for improving conductivity is preferably from 0.01 to 5.00% (W/V), more preferably from 0.01 to 0.99% (W/V) relative to the total volume of the organic solvent dispersion.

A series of procedures mentioned above yields an organic solvent dispersion of an intrinsically conductive polymer which has a greatly reduced water content less than 2%, even less than 1%, which has never been attained by conventional processes.

After the above-mentioned steps, the resulting organic solvent dispersion of an intrinsically conductive polymer should preferably undergo wet milling to improve its dispersibility. Wet milling may be accomplished by using any of sand grinder, ball mill, disper, colloid mill, ultrasonic homogenizer, and high-pressure homogenizer. The last two are desirable for easy handling, short processing time, and good dispersibility.

The organic solvent dispersion of an intrinsically conductive polymer which is obtained by the method of the invention and whose water content is small can satisfactorily show characteristics of the intrinsically conductive polymer with respect to the electric conductivity and heat ray (infrared ray) absorbability. In addition, because of the excellent conductivity ascribed to the presence of a certain type of additive, the dispersion can be appropriately employed for many applications as an electrode material, an antistatic agent, a UV absorber, a heat ray absorber, an electromagnetic absorber, a sensor, an electrolyte for electrolytic capacitor, an electrode for secondary cell and the like.

EXAMPLES

The invention will be described below in more detail with reference to Examples and Comparative Examples, which are not intended to restrict the scope thereof. Physical properties in the examples were measured as follows.

[1] pH
  Measured at 25° C. by using a digital pH meter "HM-50V", from Toa Dempa Kogyo.
[2] Electrical Conductivity
  Measured at 25° C. by using a conductivity meter "CM-30G", from Toa Dempa Kogyo.
[3] Surface Resistivity
  Measured by using "Loresta IP TCP-T250", from Mitsubishi Chemical.
[4] Viscosity
  Measured at 25° C. by using a rotational viscometer, EL type, from TOKIMEC.
[5] Particle Diameter
  Measured by using "Microtrack UPA250", from Microtrack.
[6] Water Content
  Measured by using a Karl Fisher moisture meter "MKA-3p", from Kyoto Denshi Kogyo.

Example 1

A thousand grams of an aqueous colloidal dispersion 6903-104-004 (made by ORMECON GmbH, with a solid content of 1.3 wt %, pH 2.0, and an electric conductivity of 3.9 mS/cm) of an intrinsically conductive polymer containing doped polyaniline was passed (at a space velocity per hour of 7) through a column (column diameter of 45 mm) packed with 250 ml of a hydrogen form strong acid cation exchange resin (IR-120B, from Organo), thereby obtaining 1,506 g of a cation-exchanged, aqueous colloidal dispersion. The thus obtained cation-exchanged, aqueous colloidal dispersion had pH 2.1, an electric conductivity of 2.6 mS/cm and a solid content of 0.9 wt %.

The water medium in the cation-exchanged, aqueous colloidal dispersion was substituted with methanol by a method wherein 22.5 liters of methanol was gradually added to the dispersion in an evaporator (an in-vessel pressure of 60 Torr., and an external heater temperature of 75° C.) to remove water, thereby obtaining 864 g of a methanol dispersion of the intrinsically conductive polymer (during the solvent substitution, the solid content was kept at 0.5 to 3 wt %). Then, 334 g of methanol and 9.6 g of N-methylpyrrolidone (0.7 w/v % relative to the methanol dispersion) were added to 860 g of the methanol dispersion to adjust the solid content to 1 wt %. The dispersion was treated with an ultrasonic homogenizer (UIP 2000, made by Dr. Hielscher GmbH) to obtain 1,114 g of a methanol dispersion of the intrinsically conductive polymer. The thus obtained methanol dispersion had a solid content of 1.1 wt %, a viscosity of 2.4 mPa·s, a water content of 0.9 wt %, and a particle diameter of 58 nm. This methanol dispersion was applied onto a glass sheet with an applicator (in a wet thickness of 25 μm) and dried at 110° C. for 10 minutes to obtain a film having a surface resistivity of $1.8 \times 10^3 \Omega/\square$.

It will be noted that the surface resistivity in the case where no N-methylpyrrolidone was added was at $3.5 \times 10^3 \Omega/\square$.

Example 2

A thousand grams of an aqueous colloidal dispersion 6903-104-005 (made by ORMECON, with a solid content of 1.2 wt %, pH 1.9 and an electric conductivity of 4.2 mS/cm) of an intrinsically conductive polymer containing doped polyaniline was passed through a column (with a column diameter of 45 mm) packed with 250 ml of a hydrogen form strong acid cation exchange resin (IR-120B, from Organo) at 25° C. (at a space velocity per hour of 7) to obtain 1,389 g of a cation-exchanged, aqueous colloidal dispersion. The resulting cation-exchanged, aqueous colloidal dispersion had pH 2.1, an electric conductivity of 3.1 mS/cm, and a solid content of 0.9 wt %.

The water medium in the cation-exchanged aqueous colloidal dispersion was substituted with methanol by a method wherein 22 liters of methanol was gradually added to the dispersion in an evaporator (under an in-vessel pressure of 60 Torr., at an outer heater temperature of 75° C.) to remove water, thereby obtaining 860 g of a methanol dispersion of the intrinsically conductive polymer (during the solvent substitution, the solid content was kept at 0.5 to 3 wt %). Then, 438 g of methanol and 8.1 g of N-methylpyrrolidone (0.6 w/v % relative to the methanol dispersion) were added to 854 g of the methanol dispersion to adjust the solid content to 1 wt %, the dispersion was treated with an ultrasonic homogenizer (UIP2000, made by Dr. Hielscher) to obtain 1,236 g of a methanol dispersion of the intrinsically conductive polymer. The thus obtained methanol dispersion had a solid content of 1.0 wt %, a viscosity of 2.5 mPa·s, a water content of 0.8 wt % and a particle diameter of 29 nm. The methanol dispersion was applied onto a glass sheet with an applicator (in a wet thickness of 25 μm) and dried at 110° C. for 10 minutes to obtain a film having a surface resistivity of $2.3 \times 10^3 \Omega/\square$.

It will be noted that the surface resistivity in the case where no N-methylpyrroliione was added was at $6.6 \times 10^3 \Omega/\square$.

Example 3

Eight hundred grams of an aqueous colloidal dispersion 6903-109-003 (made by ORMECON GmbH, with a solid content of 1.6 wt %, pH 1.8 and an electric conductivity of 6.4 mS/cm) of an intrinsically conductive polymer containing doped polyaniline was passed through a column (with a column diameter of 45 mm) packed with 250 ml of a hydrogen form strong acid cation exchange resin (IR-120B, from Organo) at 25° C. (at a space velocity per hour of 7) to obtain 1,137 g of a cation-exchanged, aqueous colloidal dispersion.

The resulting cation exchanged, aqueous colloidal dispersion had pH 1.9, an electric conductivity of 4.9 mS/cm, and a solid content of 1.1 wt %.

The water medium in the cation-exchanged aqueous colloidal dispersion was substituted with methylated ethanol by a method wherein 11 liters of methylated ethanol was gradually added to the dispersion in an evaporator (under an in-vessel pressure of 60 Torr., at an outer heater temperature of 75° C.) to remove water, thereby obtaining 713 g of a methylated ethanol dispersion of the intrinsically conductive polymer (during the solvent substitution, the solid content was kept at 0.5 to 3 wt %). Then, 529 g of methylated ethanol and 9.9 g of dimethylsulfoxide ((0.6 w/v %) relative to the methylated ethanol dispersion) were added to 705 g of the methylated ethanol dispersion to adjust the solid content to 1 wt %. The dispersion was treated with an ultrasonic homogenizer (UIP2000, made by Dr. Hielscher) to obtain 1,171 g of a methylated ethanol dispersion of the intrinsically conductive polymer. The thus obtained methylated ethanol dispersion had a solid content of 1.0 wt %, a viscosity of 20 mPa·s, a water content of 0.9 wt % and a particle diameter of 25 nm. The methylated ethanol dispersion was applied onto a glass sheet with an applicator (in a wet thickness of 25 μm) and dried at 110° C. for 10 minutes to obtain a film having a surface resistivity of $6.0 \times 10^2 \Omega/\square$.

Comparative Example 1

Ten grams of a hydrogen form strong acid cation exchange resin (IR-120B, from Organo) and 10 g of a hydroxyl group form strong base anion exchange resin (IRA-410, from Organo) were added to 215 g of an aqueous colloidal dispersion Baytron-P (made by Bayer AG, with a solid content of 1.3 wt %, pH 1.7 and a conductivity of 71 mS/cm) of poly-3,4-ethylenedioxythiphene (PEDOT), followed by agitation for 8 hours. The respective ion exchangers were removed by filtration to obtain 206 g of a cation-anion exchanged PEDOT aqueous colloidal dispersion. The thus obtained cation-exchanged PEDOT aqueous colloidal dispersion had pH 2.0, and a conductivity of 6.0 mS/cm.

An attempt of substituting the water medium in the obtained cation-anion exchanged PEDOT aqueous colloidal dispersion with methanol was made by a method wherein 9.0 liters of methanol was gradually added to the dispersion in an evaporator (under an in-vessel pressure of 60 Torr., at an outer heater temperature of 75° C.) to remove water. During the solvent substitution, the solid content was kept at 0.5 to 2.0 wt %. However, occurrence of a coagulation in a large amount and two-phase separation were observed, so that no uniform methanol dispersion of PEDOT could not be obtained.

The invention claimed is:

1. A method for producing an organic solvent dispersion of an intrinsically conductive polymer, which comprises:
    a deionizing step of deionizing an aqueous colloidal dispersion of an intrinsically conductive polymer by passing the dispersion through a column filled with an ion exchange resin, thereby clearing the intrinsically conductive polymer of cations adhering thereto;
    a solvent substitution step of substituting water in the aqueous colloidal dispersion with an organic solvent other than N-methylpyrrolidone and dimethylsulfoxide after the deionizing step; and
    an additive-treating step of adding from 0.01 to 5.00% (W/V), relative to the total volume of the organic solvent dispersion obtained by the solvent substitution step, of N-methylpyrrolidone or dimethylsulfoxide.

2. An organic solvent dispersion of an intrinsically conductive polymer obtained by the method defined in claim 1.

3. The method for producing an organic solvent dispersion of an intrinsically conductive polymer of claim 1, wherein the amount of the N-methylpyrrolidone or dimethylsulfoxide ranges from 0.01 to 0.99% (W/V) relative to the total volume of the organic solvent dispersion.

4. The method for producing an organic solvent dispersion of an intrinsically conductive polymer of claim 1, wherein the deionizing step is accomplished by ion exchange.

5. The method for producing an organic solvent dispersion of an intrinsically conductive polymer of claim 1, further comprising a filtration step of subjecting the aqueous colloidal dispersion of an intrinsically conductive polymer to ultrafiltration before the deionizing step.

6. The method for producing an organic solvent dispersion of an intrinsically conductive polymer of claim 1, wherein the solvent substitution step is accomplished in such a way as to keep a solid contents in a range of 0.05 to 10.0 wt %.

7. The method for producing an organic solvent dispersion of an intrinsically conductive polymer of claim 1, wherein the solvent substitution step is accomplished in such a way as to reduce a water content below 1%.

8. The method for producing an organic solvent dispersion of an intrinsically conductive polymer of claim 1, wherein the solvent substitution step is accomplished by slowly adding the organic solvent to the aqueous colloidal dispersion, thereby removing water.

9. The method for producing an organic solvent dispersion of an intrinsically conductive polymer of claim 1, wherein the organic solvent is an alcohol having 1 to 3 carbon atoms.

10. The method for producing an organic solvent dispersion of an intrinsically conductive polymer of claim 1, wherein the organic solvent has a boiling point of not higher than 80° C.

11. The method for producing an organic solvent dispersion of an intrinsically conductive polymer of claim 1, wherein the intrinsically conductive polymer contains at least an aniline unit.

12. The method for producing an organic solvent dispersion of an intrinsically conductive polymer of claim 1, wherein the intrinsically conductive polymer is doped polyaniline, doped polythiophene, a mixture thereof or a copolymer thereof.

* * * * *